United States Patent [19]
Sebastian et al.

[11] Patent Number: 5,577,461
[45] Date of Patent: Nov. 26, 1996

[54] PET FOOD DISH

[76] Inventors: Charles R. Sebastian, 224 Via Lorca, Newport Beach, Calif. 92663; Richard M. Sebastian, 1101 MacArthur Blvd., Santa Ana, Calif. 92707

[21] Appl. No.: 448,040

[22] Filed: May 23, 1995

[51] Int. Cl.⁶ .................. A01K 5/01; A01K 7/00
[52] U.S. Cl. ........................ 119/51.5; 119/61
[58] Field of Search ................... 119/51.5, 61

[56] References Cited

U.S. PATENT DOCUMENTS

| | | | |
|---|---|---|---|
| 2,584,301 | 2/1952 | Sinclair | 119/51.5 |
| 2,677,350 | 5/1954 | Prestidge et al. | 119/61 |
| 4,007,711 | 2/1977 | Michael | 119/51.5 |
| 4,357,905 | 11/1982 | Carpenter | 119/61 |
| 4,399,772 | 8/1983 | Salinas | 119/51.5 |
| 4,505,228 | 3/1985 | Scott | 119/61 |
| 4,532,891 | 8/1985 | Jones | 119/51.5 X |
| 4,716,855 | 1/1988 | Andersson et al. | 119/61 |
| 4,896,627 | 1/1990 | Riddell | 119/51.5 |
| 4,953,506 | 9/1990 | Sanders | 119/61 |
| 4,981,108 | 1/1991 | Faeroe | 119/61 |
| 5,069,166 | 12/1991 | Ahuna | 119/61 |
| 5,109,800 | 5/1992 | Williams | 119/61 |
| 5,113,798 | 5/1992 | Rera | 119/61 |
| 5,144,912 | 9/1992 | Hammett et al. | 119/61 |
| 5,148,626 | 9/1992 | Haake, Sr. | 43/121 |
| 5,245,948 | 9/1993 | McClellan | 119/51.5 |
| 5,253,609 | 10/1993 | Partelow et al. | 119/61 |
| 5,277,149 | 1/1994 | East | 119/51.5 |

FOREIGN PATENT DOCUMENTS

| | | | |
|---|---|---|---|
| 8401729 | 12/1985 | Netherlands | 119/51.5 |
| 1478466 | 6/1977 | United Kingdom | 119/61 |

*Primary Examiner*—Robert P. Swiatek
*Assistant Examiner*—Elizabeth Shaw
*Attorney, Agent, or Firm*—Blakely, Sokoloff, Taylor & Zafman

[57] ABSTRACT

A stable dual purpose feeder capable of simultaneously holding both drinking liquid as well as food. A liquid protected, food receptacle chamber that permits a food receptacle that stays dry and is easily and cleanly removable from the feeder. A moat for holding of non-drinkable liquids and solids which may prevent ants and other insects from entering the food receptacle and which does not contaminate food or drinking water. An inwardly slanted flange surface at the top of the food receptacle acts as a barrier between the moat and the animal such that the animal is prevented from drinking water or other liquid in the moat which may be treated to keep ants out. A dish configuration which minimizes spills and permits dish transportation with the use of only one hand. The food receptacle portion may be made of a disposable material.

10 Claims, 2 Drawing Sheets

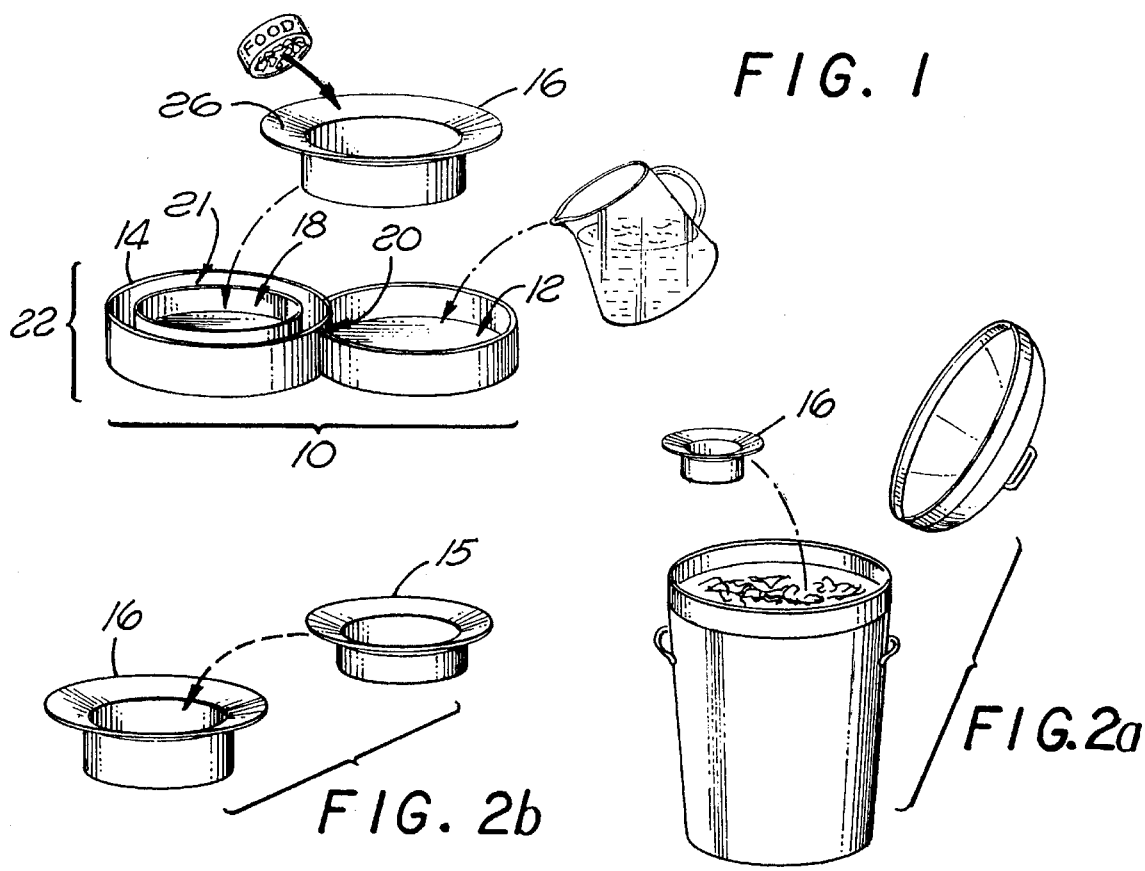
FIG. 1
FIG. 2a
FIG. 2b
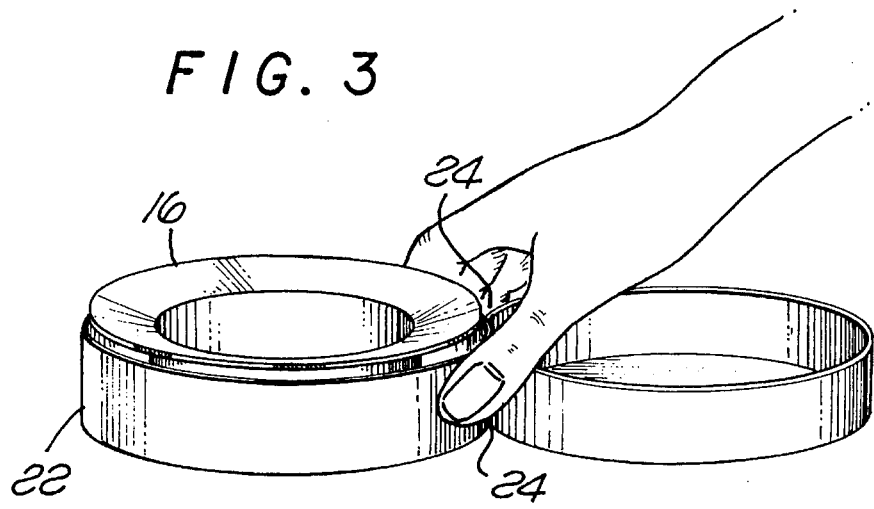
FIG. 3

PET FOOD DISH

BACKGROUND OF THE INVENTION (1) Field of the Invention

The present invention is related to the field of dishes for feeding and watering animals such as dogs and cats.

(2) Prior Art

Pet food dishes have evolved from the basic bowls to more sophisticated receptacles on a feature by feature basis without a total needs assessment of the pet and the owner. Currently, there are a variety of pet dishes typically made of plastics, metals and ceramics each of which having one or two desirable features. However, most prior art pet dishes do not address all needs and features. In addition, most prior art pet dishes that do address multiple features have numerous parts, and/or require complex assembling for feeding and disassembling or complex processing or cleaning. Examples of prior art dishes are found in Michael U.S. Pat. No. 4,007,711; Carpenter U.S. Pat. No. 4,357,905; Salinas U.S. Pat. No. 4,399,772; Scott U.S. Pat. No. 4,505,228; Riddell U.S. Pat. No. 4,896,627; Sanders U.S. Pat. No. 4,953,506; Faeroe U.S. Pat. No. 4,981,108; Ahuna U.S. Pat. No. 5,069,166; Williams U.S. Pat. No. 5,109,800; Rera U.S. Pat. No. 5,113,798; Hammett et al. U.S. Pat. No. 5,144,912; Haake, Sr. U.S. Pat. No. 5,148,626; Partelow et al. U.S. Pat. No. 5,253,609; and East U.S. Pat. No. 5,277,149.

There are various prior art pet dishes with a moat surrounding the food receptacle to prevent ants and other insects from getting into the food. These prior art pet dishes including Rera U.S. Pat. No. 5,113,789 and Carpenter U.S. Pat. No. 4,357,905 do not have any barrier between the food in the food receptacle and the water in the moat surrounding the food receptacle such that water may splash into the food in the food receptacle thereby contaminating the food, and the food may drop into the water contaminating the water. In addition, the food droppings in the water attracts insects.

In particular, Carpenter has a passageway between the liquid receptacle of the food dish and the moat surrounding the food receptacle such that the water in the pet dish for drinking purposes may be contaminated by the water in the moat surrounding the food receptacle. In addition, the water in the moat is constantly being contaminated by food droppings when a pet is eating. Also, since it is a known fact that ants will cross short distances of water either on food droppings floating in the water or on water itself to get to the food, water moats may be useless under certain conditions. Prior art discloses only water or complex hard-to-use insect stopping devices as the only means for preventing ants from reaching the food.

Prior art dish disclosed in Ahuna has a barrier between the water in the moat surrounding the receptacle and the food in the food receptacle to prevent the food from contaminating the moat water. The pet dish in Ahuna, however, is one piece and requires the entire assembly to be lifted and carried for each food bowl cleaning and resupply which may cause water spills from the moat or water dish. Also, the moat is difficult to service and clean because of the limited access to the moat opening and the faying surfaces of the moat element and the food element.

Prior art dish in East has a removable food dish but no food shield. This allows the food to drop in the water causing contamination, and the water in the base element to wet the top element which is the food receptacle causing water drips when resupplying the dish. Also, and more importantly, since the drinking water and the moat are one in the same, East's dish is limited to using water only as the ant barrier which as stated earlier may be useless under some conditions.

In summary, it appears that prior art has either applied simple approaches that leave major problems in pet feeder designs such as water and food contamination, or in the other extreme, prior art has applied complex approaches which are difficult to manufacture, hard to service and messy.

It is therefore desirable to have a simple to manufacture, simple to carry and use, combination food and water pet feeder that permits the use of effective, ant-resistant moat liquids, other than water, without risking pet safety and the contamination of the food or drinking water. It is also desirable to have a feeder that protects the food from contaminating the drinking water and the drinking water from contaminating the food. Further, it is desirable to have a pet dish which allows for easy removal, and no-drip refill of the food receptacle or to use disposable and recyclable food receptacle elements interchangeably with a reusable food receptacle.

BRIEF SUMMARY OF THE INVENTION

The present invention is a new and improved pet dish which overcomes the many disadvantages inherent in the prior art pet dishes.

The present invention is a dual purpose feeder in that it holds both drinking liquid as well as food. A moat surrounding the food receptacle chamber allows for holding of water and other liquids and solids which may prevent ants and other insects from entering the food receptacle without contaminating the drinking water or food. An inwardly slanted flange surface at the top of the food receptacle acts as a barrier between the animal and the moat such that the animal is prevented from drinking water or liquid in the moat which may be treated to keep ants out. Further, the present invention's pet dish allows easy transportability due to its unique hand holdable design feature.

The pet dish of the present invention has two elements. The first element is composed of a moat area, a dry chamber for the food receptacle and a liquid receptacle for drinking purposes, and the second element is composed of a food receptacle. The second element is easily removable yet becomes stable in place inside the first element without the requirement of proactively securing the second element onto the first element. There is a protective barrier (dry chamber) between the food receptacle and the moat preventing the water or liquid in the moat from wetting and or contaminating the food receptacle permitting no drip food resupply.

The food receptacle/second element may consist of a liner inside the food dish or in the alternative may consist of a stand alone dish of disposable material including paper or plastic. The pet dish of the present invention therefore allows one to dispose of the food receptacle/second element when feeding is completed. Because of the dry chamber barrier between the water in the moat and the food receptacle, the food receptacle may easily be lifted out of the first element and transported to a remote area away from the first element without water dripping off of the food receptacle/second element. In addition, because the food receptacle does not get wet, the food receptacle portion may be made of disposable paper.

BRIEF DESCRIPTION OF THE DRAWINGS

FIG. 1 illustrates a pet dish of the present invention.

FIG. 2a illustrates the embodiment of the pet dish of the present invention where the food receptacle is disposable.

FIG. 2b illustrates an alternative embodiment of the food receptacle of the present invention.

FIG. 3 illustrates the easy transportability of the pet dish by a user.

DETAILED DESCRIPTION OF THE INVENTION

Figure 4A:
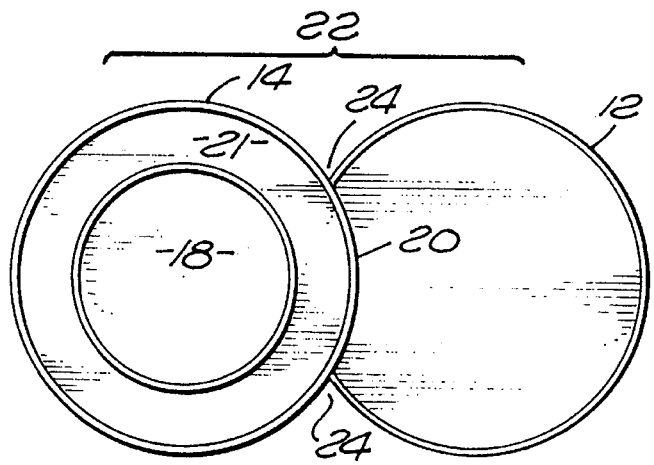
FIG. 4a illustrates an aerial view of the pet dish of the present invention.

The present invention is a new and improved pet dish overcoming all the disadvantages of currently existing pet dishes.

FIG. 1 illustrates a pet dish of the present invention. Pet dish 10 has first element 22 and second element 16. Second element is a removable food receptacle which is placed into a liquid protected (dry) chamber 18 of first element 22 of pet dish 10 which permits the food receptacle to be washed and resupplied without moving the entire pet dish 10 and prevents ants from passing from the top portion of outer circumference portion 14 to outer circumference portion of element 16. Pet dish 10 also has liquid receptacle portion 12 in which liquid for consumption may be stored. Portion 14 of first element 22 consists of the outer circumference portion of the non-consumption liquid receptacle. Between inner circumference portion 18 and outer circumference portion 14, exists a space surrounding the inner circumference which acts as a moat. This moat portion 22 may be filled with water as well as other anti-insect material such as biodegradable liquid soap solutions which may prevent ants and other insects from reaching the food in food receptacle 16 once food receptacle 16 is placed in dry chamber inside 18.

The present invention is a new and improved pet dish which overcomes the many disadvantages inherent in the prior art pet dishes. The present invention's pet dish 10 allows for easy transportability due to its unique hand holdable design feature, and spill resistant vertical wall of element 22. The present invention is a dual purpose feeder in that it holds both drinking liquid as well as food simultaneously. Moat 21 surrounding the food receptacle allows for holding of water and other anti-insect solution which may prevent ants and other insects from entering the food receptacle. Flange ring 26 surrounding and integral to the food receptacle acts as a barrier between the moat and the animal such that the animal is prevented from drinking the treated water in the moat. Flange ring 26 also prevents food from falling into and contaminating the moat liquid.

As mentioned earlier, pet dish 10 of the present invention has second element 16 composed of the food receptacle and second element 22 composed of moat 21 and liquid receptacle 12 for drinking purposes. Second element 16 is easily removable yet stable in place inside first element 22 without the requirement of securing second element 16 onto first element 22. There is protective dry barrier 20 between food receptacle 16 and moat 21 preventing the water or substances in moat 21 from wetting food receptacle 16. Second element 16 may be made of or lined with disposable material including paper and plastic or may be made in duplicate such that while one dish is on the pet dish, the other could be in the dishwasher.

The pet dish of the present invention therefore allows one to dispose of the food receptacle when feeding is completed. Because of barrier 20 between the water in moat 21 and food receptacle 16, food receptacle 16 may easily be lifted out of first element 22 and transported to a remote area away from first element 22 without water or liquid substances dripping off of the food receptacle 16. In addition because food receptacle 16 does not get wet, food receptacle 16 may be made of disposable paper.

FIG. 2a illustrates the embodiment of the pet dish of the present invention where food receptacle 16 is disposable. The disposable food receptacle 16 may be made of any disposable material including paper or plastic. The convenience of being able to throw away the food receptacle portion without having to have to wash and clean it out after each use is one of the many advantages of the present invention. In addition, such disposable food receptacle 16 may be made of material which is inexpensive and which may be sold in a bulk pack. It is therefore efficient and cost effective both for the user as well as the manufacturer or distributor. This is especially important in this age of fast paced and hectic lifestyles demanded of people. Being able to have a convenient way of feeding and taking care of the mess after each feeding gives great advantages to the user and further reduces ant infestation.

FIG. 2b illustrates an alternative embodiment of the food receptacle of the present invention. In this embodiment, a liner which may also be disposable may be placed inside of food receptacle 16. Liner 15 may be made of a thin material. The stability gained by liner 15 by being placed in durable food receptacle 16, prevents a pet from tipping or crushing liner 15. At the same time, liner 15's thinner material lowers manufacturing costs. A user may remove food receptacle 16 with liner 15 after feeding, and may dispose of the liner 15 without having to clean food receptacle 16. Since liner 15 may be made to cover the top surface area of food receptacle 16 it may prevent food receptacle 16 from getting soiled.

FIG. 3 illustrates the easy transportability of pet dish 10 by a user. The indented side portions 24 of pet dish 10 allows for a user to transport pet dish 10 by only using one hand. Indented side portions 24 allow a person of average sized hands to grab onto the middle of pet dish 10 where the indentations are by, for example, wrapping a thumb on one indentation portion and the rest of their fingers on the other indentation portion. Because this indentation portion is in the middle of pet dish 10, even if pet dish 10 contains water in liquid receptacle 12 and/or in moat 21, pet dish 10 may be well balanced during transportation by a user.

FIG. 4a illustrates an aerial view of first element 22. As described earlier, indentation 24 on both sides of pet dish 10 allows for easy transportability of pet dish 10. Because outer circumference portion 14 and liquid receptacle 12 are of approximately equal circular size, it is easy to balance pet dish 10 during transportation.

Figure 4B:
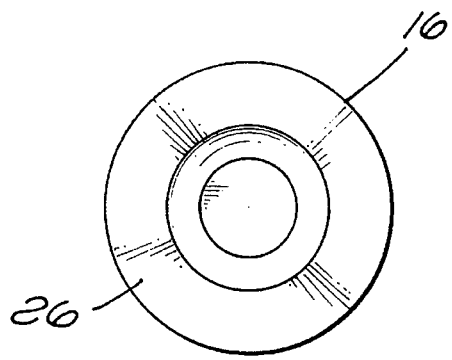
FIG. 4b illustrates an aerial view of the food receptacle.

FIG. 4b illustrates an aerial view of food receptacle 16. As can be seen, food receptacle 16 is of approximately the same circular size in diameter as outer circumference portion 14 of first element 22. Flange ring portion 26 of food receptacle 16 covers moat 21 of first element 22 preventing the animal eating out of food receptacle 16 from getting to moat 21.

Figure 5A:
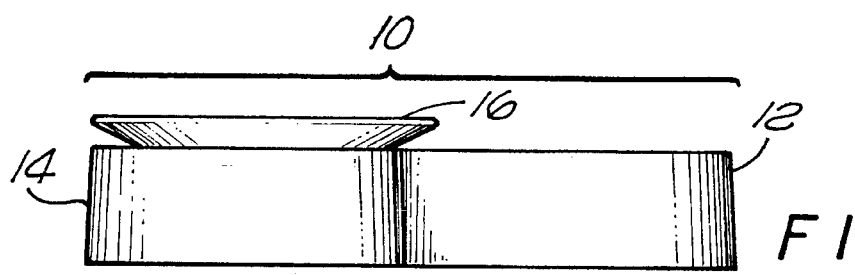
FIG. 5a illustrates the length of the pet dish of the present invention.
Figure 5B:
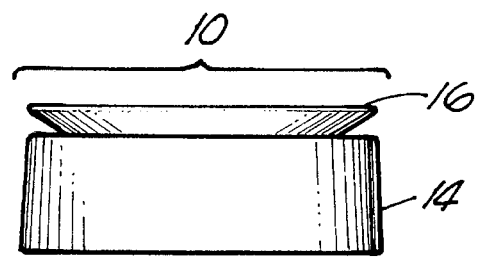
FIG. 5b illustrates a view from the food receptacle's side of the pet dish of the present invention.

FIG. 5a illustrates the length of pet dish 10. FIG. 5b illustrates the side view from the pet dish portion holding the food receptacle.

Figure 6:
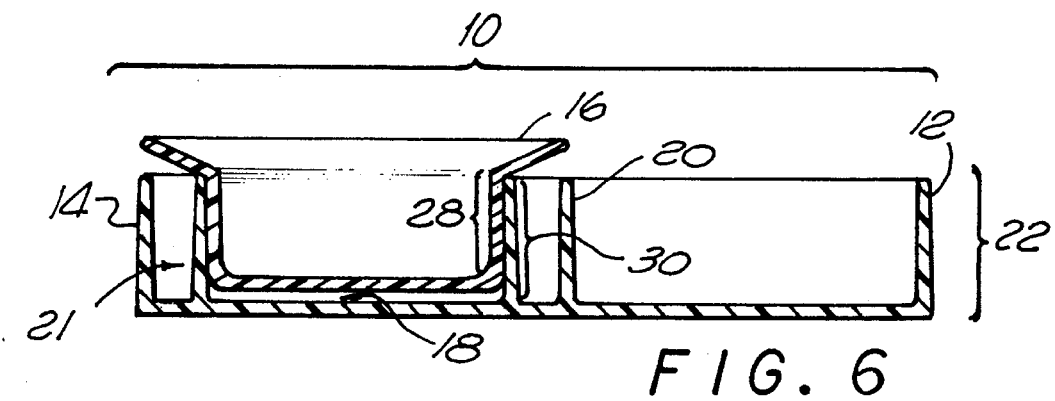
FIG. 6 illustrates a sectional view of the pet dish of the present invention.

FIG. 6 illustrates a sectional view of the pet dish of the present invention. As can be seen, border 20 of first element 22 prevents liquid contained in liquid receptacle 12 from entering moat 21, and vice versa. The liquid or solids or any other anti-insect material in moat 21 is therefore prevented from contaminating the drinking liquid contained in liquid receptacle 12. Food receptacle 16 fits easily into dry chamber 18 of first element 22. Vertical sides 12 and 14 reduce the incidence of water spillage due to transport or inadvertent movement of the dish.

There is no necessity of any difficulty to assemble attachments or any extraneous parts. Food receptacle 16 is easily removable. In addition, once placed in liquid protected dry chamber 18, food receptacle 16 is stable in place and may not be easily tipped over. This is due to the length between side 28 of food receptacle 16 and side wall 30 of chamber 18. In other words, a pet may play with the top of the flange surface ring portion 26 of food receptacle 16 but will not be able to flip food receptacle 16 out of chamber 18 of first element 22.

What has been described is a new and improved pet food dish overcoming most if not all the disadvantages inherent in the prior art pet dishes.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A pet dish comprising:
   a first element for holding food, and having an inwardly slanted flange integral ring portion; and
   a second element comprising,
   a liquid receptacle for holding liquid for consumption, and
   a liquid protected dry chamber having a bottom portion for holding said first element and surrounded by a moat, said first element capable of being lifted out of said dry chamber for easy removal.

2. The pet dish of claim 1 further comprising indentation on one or more sides of said second element allowing for easy transportability of said pet dish by use of one hand.

3. The pet dish of claim 1 wherein said first element is made of disposable material.

4. The pet dish of claim 1 wherein said liquid protected dry chamber is comprised of spill resistant vertical walls keeping said first element in place.

5. The pet dish of claim 1 wherein said first element's slanted flange is for keeping dropped food inside said first element.

6. A pet dish comprising:
   means for holding food, and having an inwardly slanted flange integral ring portion;
   means for holding liquid for consumption; and means for creating a moat, said means for holding food capable of being lifted out of said means for creating a moat for easy removal, and said means for creating a moat having a liquid protected by dry chamber with a bottom portion.

7. The pet dish of claim 6 further comprising means for transporting said pet dish by use of one hand.

8. The pet dish of claim 6 wherein said means for holding food is made of disposable material.

9. The pet dish of claim 6 wherein said means for creating is comprised of spill resistant vertical walls keeping said means for holding food in place.

10. The pet dish of claim 6 wherein said means for holding food comprises means for keeping dropped food inside said means for holding food.

\* \* \* \* \*